Nov. 16, 1965 T. D. BISHOP 3,217,902
APPARATUS FOR FORMING PLURAL STACKS OF ARTICLES
Filed April 8, 1963 3 Sheets-Sheet 1

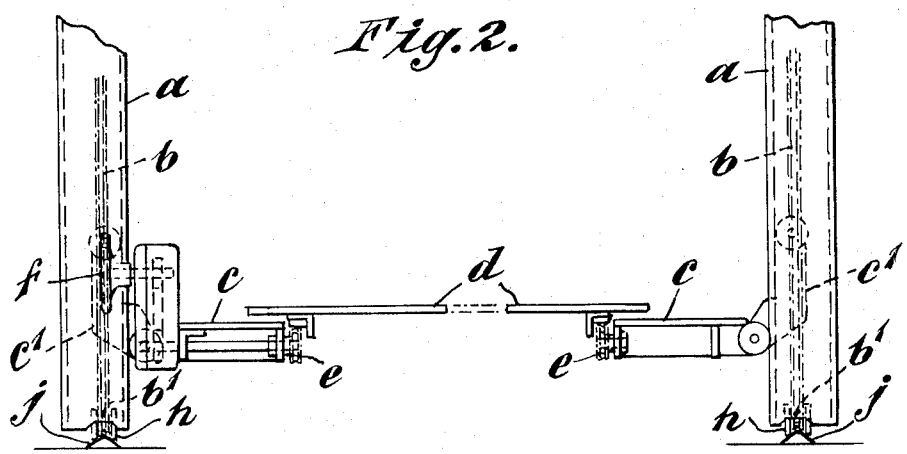
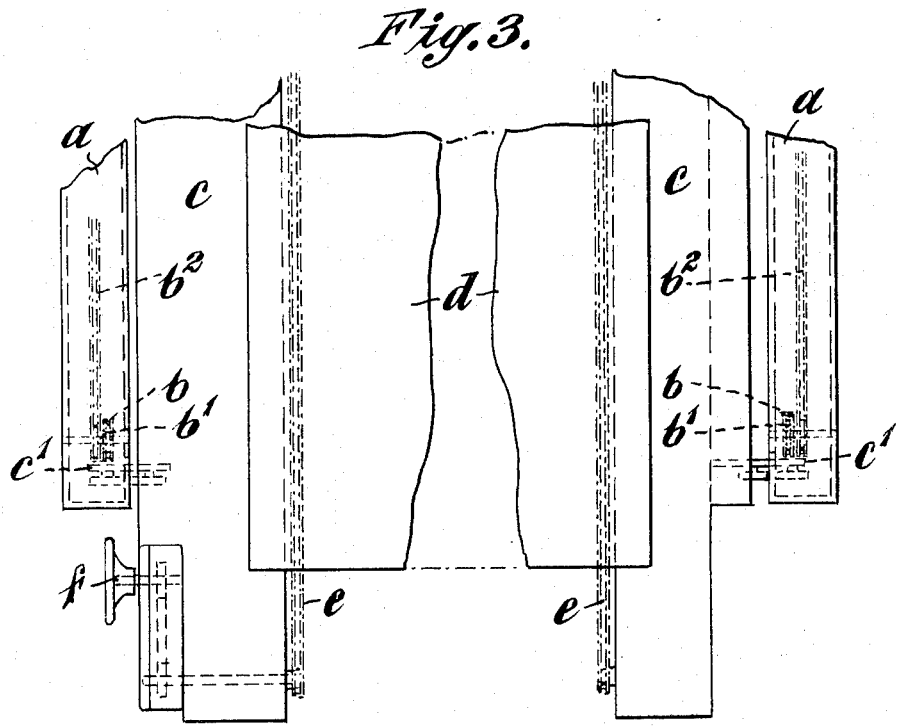

United States Patent Office 3,217,902
Patented Nov. 16, 1965

3,217,902
APPARATUS FOR FORMING PLURAL STACKS OF ARTICLES
Thomas Desmond Bishop, Solihull, England, assignor to The Deritend Engineering Company Limited, Birmingham, England, a British company
Filed Apr. 8, 1963, Ser. No. 271,183
Claims priority, application Great Britain, Apr. 28, 1962, 16,293/62
3 Claims. (Cl. 214—6)

The present invention has relation to the reception of cardboard and like blanks (hereinafter referred to in the body of the specification simply as blanks) from a machine by which they have been treated.

The blanks are cut and shaped or otherwise treated by a machine and are delivered expeditiously so that a retarding mechanism is necessary such as that disclosed in our prior British patent specification No. 812,485 wherein there is claimed mechanism for retarding the delivery of cardboard and like blanks from a machine by which they have been treated wherein the treated board is passed between initial twin delivery rollers of the machine which run at a predetermined speed following which it engages secondary delivery superimposed twin rollers driven at a considerably reduced speed, the lower one of which is associated with an endless belt the other loop end of which is engaged with the lower roller of a still further pair of superimposed synchronously operating rollers.

The present invention is however concerned more particularly with the final reception of the blanks from the rearding machine, the mechanism forming the subject-matter of the present invention providing for the efficient collection of the board in stacked form, their ready removal when stacking has been completed, and easy adjustment means for enabling stacks of board of varying dimension to be properly accommodated and stacked.

According to the present invention means for the recepetion of the blanks from a machine by which they have been treated, comprise two parallel members adapted to be electrically and/or mechanically lowered and elevated in parallelism in a suitable frame associated with the retarding mechanism, said members being adapted to support a pallet in such a manner that the said pallet can be displaced backwards and forwards in relation to the said members and the retarding mechanism so that, that part of the pallet not required for the first stack may be underneath the retarding mechanism, the parallel members carrying the pallet during the loading of the blanks being automatically controlled by a photo electric cell or by mechanical or other means whereby the said members and pallet descend at the correct speed according to the loading speed, said loading when completed enabling the pallet to be wheeled away with its stack ready for the next stacking reception.

In order that the invention may be clearly understood and readily carried into practice reference may be had to the accompanying explanatory drawings in which:

FIG. 2 is an end view looking from the left of part of the mechanism seen in FIG. 1.

FIG. 3 is a plan view of FIG. 2.

In that embodiment of the invention illustrated, two parallel side frames $a$ are employed and each has two upright endless chains $b$ operating on sprockets $b^1$ to corresponding runs of which an elevator comprising horizontal parallel bars or members $c$ are attached by means of brackets $c^1$ so that by the rotation of the endless chains $b$ the parallel bars or elevator members $c$ are caused to rise and descend simultaneously according to the direction of rotation of the sprockets $b^1$. A prime mover such as an electric motor $b^3$ is employed for driving the sprockets $b^1$ and raising and lowering the bars or members $c$ with appropriate reversing gear, the chains $b$ being interconnected by means of horizontal endless chains $b^2$.

Figure 5:
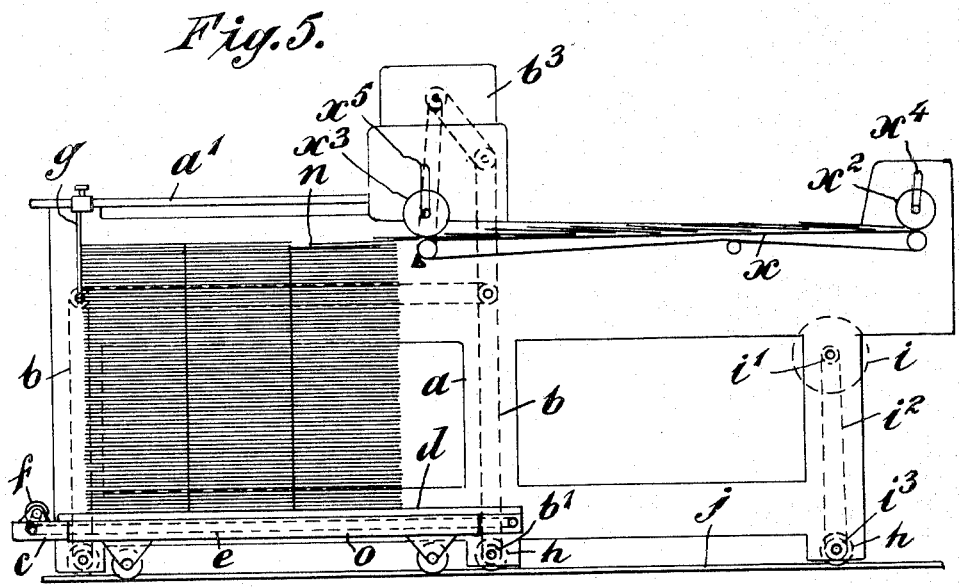

The pallet $d$ is of flat formation and may itself be provided with wheels or castors and it is of such a dimension that it can be slid on to the parallel elevator rails or members $c$ so that the pallet $d$ can be raised and lowered. In FIG. 5 the pallet $d$ is shown without wheels and is removed by a separate wheel truck $o$ when it has rested after having been lowered to its lowermost position.

It will be appreciated also that the pallet may be moved forwardly and backwardly on the rails or elevator members $c$ beneath the conveyor belts. The adjustment of the pallet $d$ is effected by means of endless chains $e$ mounted on the bars or members $c$ said chains having dogs $e^1$ which engage notches in the underside of the pallet $d$ so that when the chains $e$ are operated by means of a hand wheel $f$ the pallet $d$ is moved forwardly and rearwardly to its position of adjustment beneath the conveyor belts to suit various sizes of blank. An adjustable vertical stop plate $g$ is slidably mounted on graduated guides $a$ on the machine for co-operation with the pallet $d$.

Figure 1:
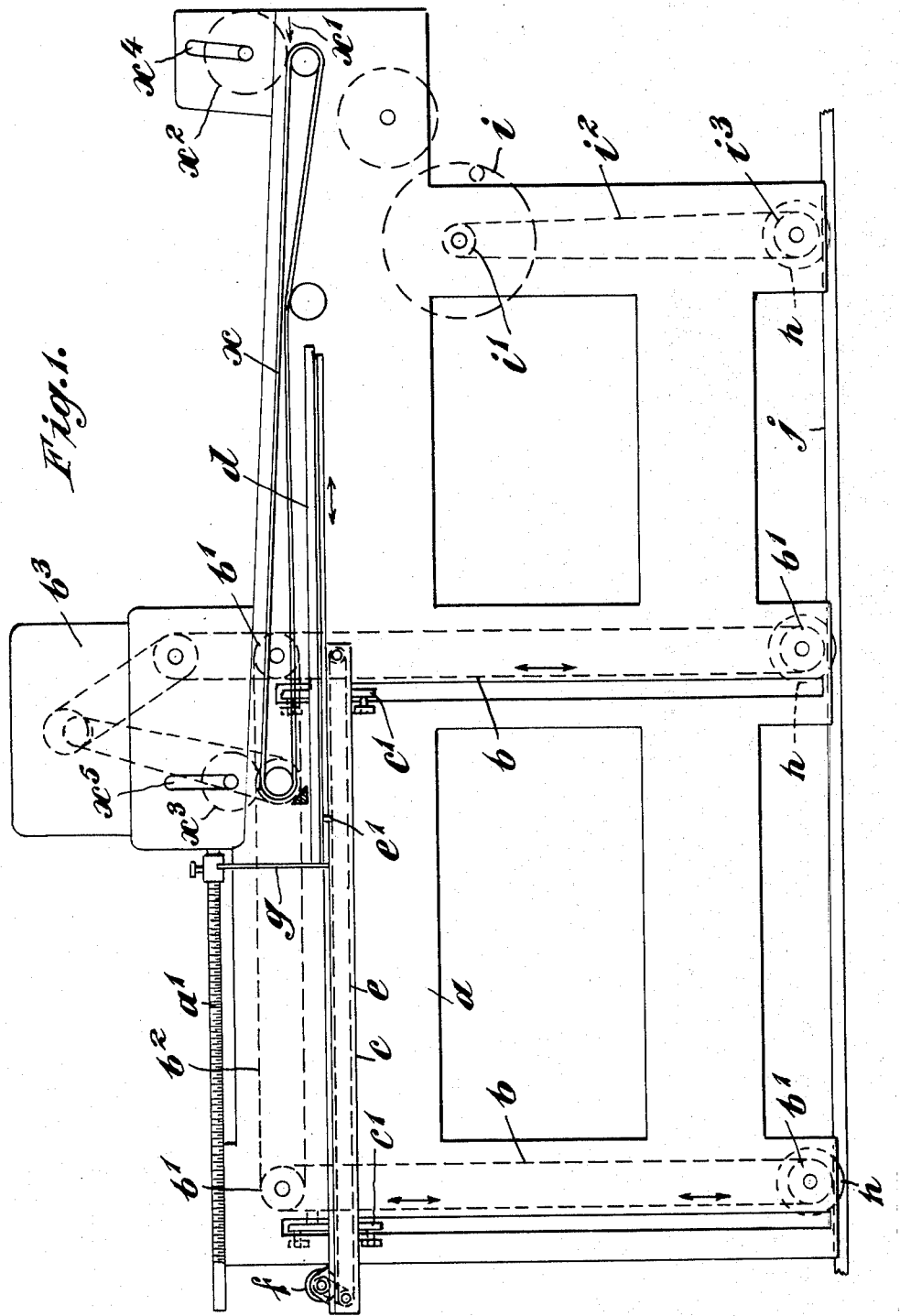
FIG. 1 is a diagrammatic side elevation showing the retarding and stacking mechanism.

The blanks come through from the treating machine and also through the retarding machine into the present apparatus and they may arrive in fanned or overlapping formation. The endless belt $x$, FIG. 1, receives the blanks from the machine originally treating them in the direction of the arrow $x^1$, $x^2$ and $x^3$ are rollers mounted in slots $x^4$, $x^5$ in accordance with our British Patent No. 812,485 for slowing the pace of the blanks before they are fed onto the pallet, see FIGS. 4 and 5. If desired a photo-electric cell may be incorporated so that a small complete stack blocks the light and sets a motor in operation to lower the pallet. When the board is fanned out the light may pass through the fanned out board so that the pallet is not set in operation until the boards are stacked when the light is blocked and the movement of the mechanism is set in operation to lower the pallet.

Alternatively the fanned out or overlapping blanks arriving on the pallet may actuate a lever or mechanical device to set the pallet descending and it is timed to descend at the correct speed according to the speed of arrival of the blanks.

When the pallet $d$ supported on the bars $c$ has completely descended and is fully stacked with the blanks it can be readily moved away on its wheels or castors or on a separate wheeled truck.

Figure 4:
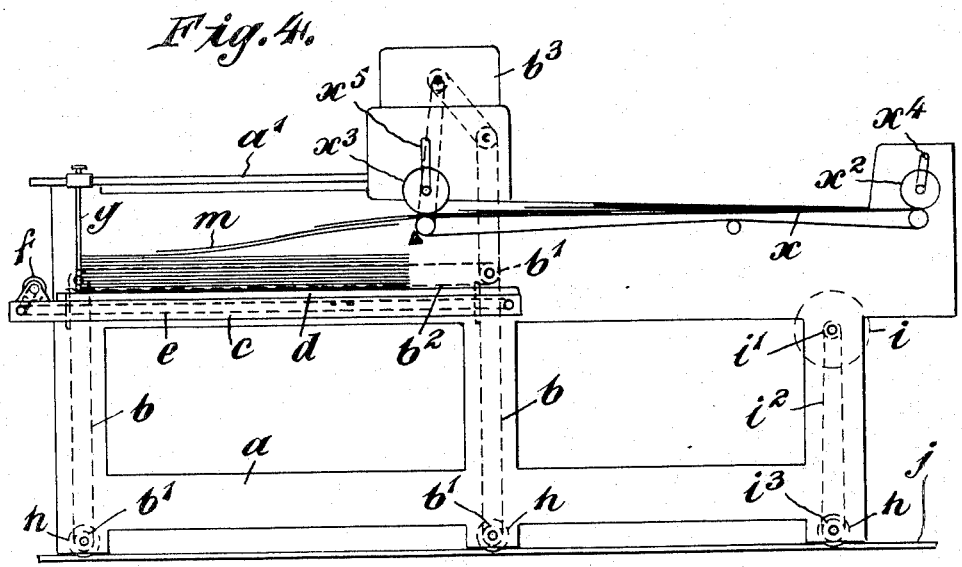
FIG. 4 illustrates diagrammatically the stacking of somewhat elongated boards and FIG. 5 the final stacking of shorter boards the pallet being ready for the introduction of the wheel truck for removal of the boards.

In FIG. 4 the blanks $m$ are somewhat elongated and the stop plate is disposed at the rear of the pallet $d$ which is withdrawn away from the retarding mechanism as shown. In FIG. 5 the pallet $d$ has been withdrawn in three stages and the final blanks are being built up against the second stack. In this figure the pallet $d$ is at its lowest position and when the stacking of the pile marked $n$ is complete the pallet can be removed by the truck $o$.

The machine is preferably mounted on wheels $h$ to run on rails $j$ so that the said machine may be adjusted to its correct position for receiving the blanks from the treating machine. This adjustment is carried out by means of a hand wheel $i$, sprocket $i^1$, chain $i^2$ and sprocket $i^3$ which rotates the front pair of wheels $h$.

I claim:

1. A stacking machine for forming a plurality of stacks of cardboard and like blanks comprising, in combination, a conveyor and retarder mechanism for delivering the cardboard blanks, elevator means comprising a pair of spaced apart parallel rails movable in a vertical direction in accordance with the height of a stack being formed, said rails extending in the direction of movement of the blanks from a position directly beneath said conveyor and retarder mechanism to a position substantially beyond the delivery end of the conveyor and retarder mechanism, and pallet drive means mounted on said parallel rails, said drive means being adapted to selectively position a pallet supported on said elevator means at selected positions corresponding to stacks to be formed between a first position at which a major portion of the pallet is beneath said conveyor and retarder mechanism for accumulating a first stack of blanks and a second position at which the pallet is beyond the delivery end of the conveyor and retarder mechanism for accumulating a final stack of blanks whereby a plurality of stacks of blanks may be successively accumulated on the pallet.

2. In a stacking mechanism according to claim 1 drive means responsive to the accumulation of blanks in a stack for lowering the elevator means proportionally to the delivery of the conveyor and retarder mechanism.

3. A stacking mechanism according to claim 1 in which the pallet drive means comprises a pair of endless drive chains, and a drive dog on each chain adapted to drivingly engage a pallet supported thereon.

References Cited by the Examiner

UNITED STATES PATENTS

| | | | |
|---|---|---|---|
| 1,863,465 | 6/1932 | Borrowdale | 271—88 |
| 1,928,923 | 10/1933 | Andersen | 271—88 |
| 2,089,890 | 8/1937 | Graf et al. | 271—88 |
| 2,228,887 | 1/1941 | Peterson. | |
| 2,414,059 | 1/1947 | Powers | 271—68 |
| 2,525,311 | 10/1950 | Peyrebrune | 271—88 |
| 2,626,800 | 1/1953 | Martin. | |
| 2,675,928 | 4/1954 | Slater. | |
| 2,788,131 | 4/1957 | Bergustrom et al. | 271—88 |
| 3,046,010 | 7/1962 | Schneider | 271—88 |

FOREIGN PATENTS 812,485  4/1959  Great Britain.

GERALD M. FORLENZA, *Primary Examiner.*

MORRIS TEMIN, HUGO O. SCHULZ, *Examiners.*